May 26, 1964 S. A. WINROTH 3,134,414
PEELING DEVICE
Filed Oct. 4, 1961
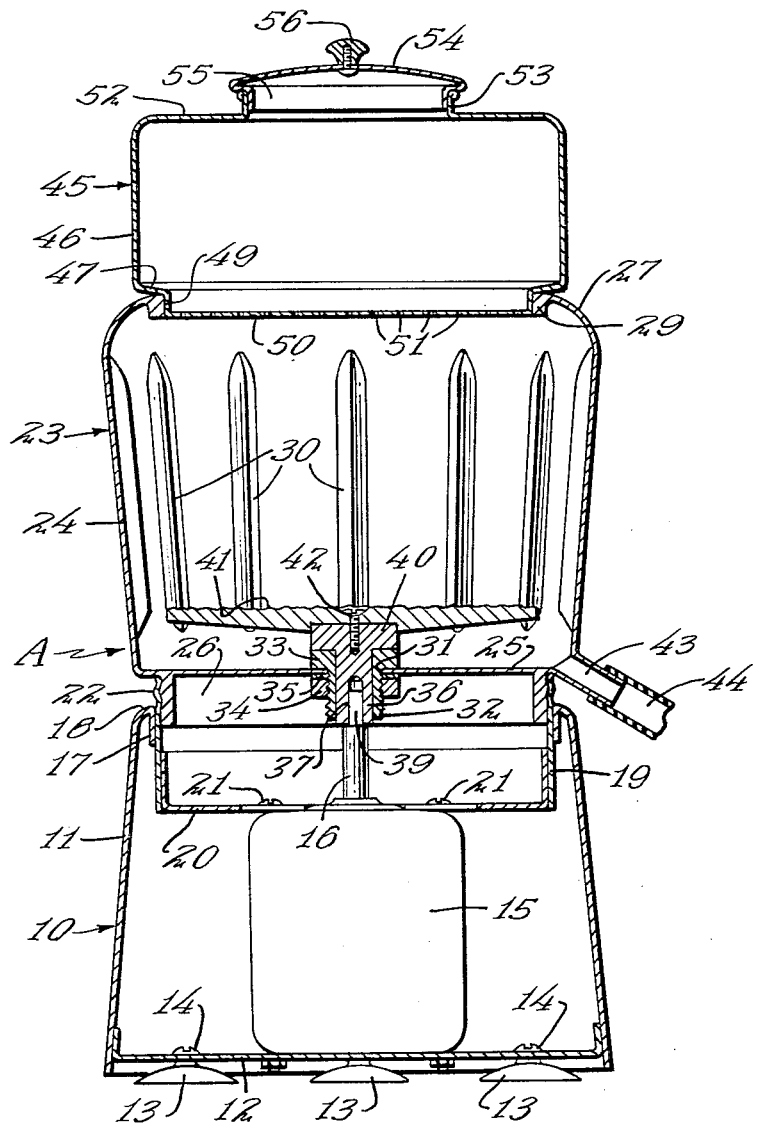
INVENTOR
SIDNEY A. WINROTH
BY *Robert M. Dunning*
ATTORNEY

United States Patent Office 3,134,414
Patented May 26, 1964

3,134,414
PEELING DEVICE
Sidney A. Winroth, Halstad, Minn.
Filed Oct. 4, 1961, Ser. No. 142,813
2 Claims. (Cl. 146—50)

This invention relates to an improvement in peeling device for potatoes and other vegetables and deals particularly with a simple and effective apparatus for removing the peels from potatoes and other vegetables.

An object of the present invention resides in the provision of a simple and inexpensive device for removing the peelings from vegetables. The device includes a motor mounted within a base housing and having a vertical shaft. A bowl is detachably supported upon the housing and is designed to accommodate the vegetables being peeled. A generally horizontal disc having an uneven or abrasive upper surface is mounted upon a shaft which extends downwardly through the bottom of the bowl and is detachably connected to the motor shaft for rotation in unison therewith. When vegetables are placed upon the disc and the motor is actuated, the disc rotates and removes the peel from the vegetables placed in the bowl.

A feature of the present invention resides in the provision of a construction of the type described in which the interior of the bowl is provided with angularly spaced inwardly extending ribs which tend to prevent free rotation of the vegetables, within the bowl. As the abrasive disc rotates, there is a tendency for the vegetables to be urged outwardly by centrifugal force. The inwardly projecting ribs on the bowl tend to prevent the vegetables from rotating with the supporting disc, so that the disc will at all times rotate relative to the vegetables.

A further feature of the present invention resides in the provision of a drain through which liquid within the bowl may flow, and a water receptacle which may form a cover for the bowl. After the vegetables have been placed within the bowl, the reservoir which fits on the top of the bowl is filled with water and placed on the top of the bowl to form a closure therefor. During the peeling operation, the water drains from the receptacle and tends to clean the vegetables as they are peeled by the abrasive disc.

These and other objects and novel features of the present invention will be more clearly and fully set forth in the following specification and claims.

The drawing illustrates a vertical sectional view through the center of the apparatus.

The peeler is indicated in general by the letter A. It includes a base housing 10 which in the form illustrated comprises a slightly frusto conical wall 11, the lower larger diameter end of which is closed or partially closed by a plate 12. The undersurface of the plate 12 is provided with a series of suction cups 13 which are secured to the plate in any suitable manner such as by the screws 14. The plate 12 also supports a motor 15 having a vertically extending shaft 16.

The upper end of the housing wall 11 is formed inwardly as indicated at 18, from which a downwardly extending flange 17 extends. While the specific arrangement of the construction is not believed particularly important, a ring-shaped flange 19 is secured within the flange 17, and a cup-shaped flange 20 is secured within the ring 19 or is integral therewith. The purpose of this arrangement is to provide an upper support for the motor 15, the motor being secured to the cup-shaped flange 20 by means of bolts 21 or other suitable means. The upper extremity of the ring 19 is provided with internal threads as indicated at 22.

A bowl which is indicated in general by the numeral 23 is threaded into the ring 19. The bowl 23 includes a generally frusto conical housing 24 having a closed lower end 25. A cylindrical flange 26 is axially supported on the under surface of the receptacle bottom 25, the flange 26 being externally threaded to fit within the threads 22 of the ring 19. Thus the two parts of the device including the bowl and the base housing may be secured together to prevent relative rotation.

The upper end of the wall 24 is curved inwardly as indicated at 27, and terminates in a cylindrical flange 29. The inner surface of the wall 24 is preferably provided with angularly spaced ribs or ridges 30 which are designed to engage the vegetables being peeled and prevent these vegetables from spinning in unison with the rotating disc which will be described.

The bottom 25 of the receptacle 23 is provided with an axial aperture 31 through which the threaded shank of a bushing 32 extends. The bushing 32 is provided with an enlarged diameter upper end 33, the under surface of which is in face contact with the bottom 25 encircling the aperture 31. A nut 34 is provided on the threaded bushing 32, and a gasket 35 is interposed between the nuts 34 and the bottom panel 35, or between the head 33 and the bottom 25 to form a seal. The bushing 32 serves as a bearing for a disc support 36 having a socket 37 in its under surface to accommodate the multi-sided upper end 39 of the motor shaft 16. The upper enlarged end 40 of the connector 36 is secured to the disc 41 by means of a screw 42 or by other suitable means. The upper surface of the disc 41 is roughened, grooved, or provided with abrasive so as to remove the skin from the vegetable being peeled.

The purpose of the construction described is to provide a bowl 23 which may be removably attached to the base portion 10 and which includes a disc 41 which is rotated by the motor 15. The detail of the specific construction for supporting the disc and the bowl may be varied if desired.

A drain passage 43 is provided adjoining the bottom 25 of the bowl and extending downwardly at an angle therefrom. The drain opening 43 is preferably attached to a drain tube 44 which may extend into a sink or the like.

A water receptacle 45 is detachably supported on the upper end of the bowl 23. The water receptacle 45 is shown as including a generally cylindrical wall 46 which is connected by an inwardly extending offset 47 to a short cylindrical wall 49 designed to fit within the flange 29 at the top of the bowl 23. The bottom of the wall 49 is closed by a bottom wall 50 having a predetermined number of apertures 51 therethrough. The top of the water receptacle is indicated at 52 and terminates in an upwardly extending neck 53 which is in effect an axial upwardly extending flange. A lid 54 is provided with a downwardly extending cylindrical flange 55 which frictionally fits within the flange 53. A handle 56 is provided in the center of the lid 54 by means of which the lid may be removed.

In operation, the apparatus is placed in a position convenient to a sink with the drain tube 44 extending into the sink. The vegetables to be peeled are placed within the bowl 23 to rest upon the disc 41. The receptacle 45 is filled with water and placed in position upon the bowl. The motor 15 is then turned on, causing the disc 41 to rotate at a desired speed. In preferred form, the current supply to the motor 15 is controlled by a rheostat or other speed regulating means capable of controlling the speed of rotation of the disc 41.

As the vegetables rest upon the surface of the disc 41, they tend to rotate or roll due to the rotation of the disc. The vegetables nearest the walls of the bowl 23 are urged outwardly by centrifugal force. When this occurs their movement is interrupted by the ribs 30, so that the vegetables roll on the upper surface of the disc. As a result, the rotation of the disc acts to grind or abrade the peeling from the outer surface of the vegetables.

During the peeling operation, water drips through the apertures 51 in the under surface of the water receptacle 45 tending to clean the vegetables and also to remove adherent parts of peeling from the vegetables. After a short period of operation, the motor 15 is cut off and the peeled vegetables are removed from the bowl 23.

While the apparatus has been described as being designed for peeling vegetables, it is believed obvious that fruits and other products may also be peeled. Thus in the use of the word "vegetable" it is intended that any similar product be included.

In accordance with the patent statutes, I have described the principles of construction and operation of my improvement in peeling device, and while I have endeavored to set forth the best embodiment thereof, I desire to have it understood that changes may be made within the scope of the following claims without departing from the spirit of my invention.

I claim:

1. An apparatus for peeling vegetables and the like including a base housing, a motor having a generally vertical drive shaft terminating within said base, a bowl supported on said base housing and including a bowl bottom above said shaft, a bushing mounted in the bottom of the bowl and extending therethrough, a connector member including a cylindrical portion extending downwardly through said bushing and having an enlarged disk portion at the top providing a flange engaging the upper end of said bushing to provide a seal, said connector member and said shaft having longitudinally engageable and disengageable connecting means operable, when engaged, to rotate said connector member with said shaft, and an abrading disk secured to said enlarged disk portion of said connector member concentric therewith and rotatable therewith.

2. The structure of claim 1 and in which said bowl has a flange at the top, and including a water receptacle telescopically engageable in said flange, the bottom of said water receptacle being below the top of said bowl and being perforated at various points throughout its area, said bowl including a drain near the bottom thereof.

References Cited in the file of this patent

UNITED STATES PATENTS

| 2,442,600 | Horton | June 1, 1948 |
| 2,613,712 | Pearlman | Oct. 14, 1952 |
| 2,771,111 | Seyfried | Nov. 20, 1956 |

FOREIGN PATENTS

| 5,435 | Great Britain | 1886 |
| 266,049 | Switzerland | Apr. 1, 1950 |